US010394972B2

(12) United States Patent
Martin

(10) Patent No.: US 10,394,972 B2
(45) Date of Patent: Aug. 27, 2019

(54) SYSTEM AND METHOD FOR MODELLING TIME SERIES DATA

(71) Applicant: Dell Products, LP, Round Rock, TX (US)

(72) Inventor: Troy J. Martin, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 453 days.

(21) Appl. No.: 14/959,599

(22) Filed: Dec. 4, 2015

(65) Prior Publication Data

US 2017/0161409 A1 Jun. 8, 2017

(51) Int. Cl.
*G06F 17/50* (2006.01)
*G06F 17/18* (2006.01)

(52) U.S. Cl.
CPC .......... *G06F 17/5009* (2013.01); *G06F 17/18* (2013.01)

(58) Field of Classification Search
None
See application file for complete search history.

(56) References Cited

U.S. PATENT DOCUMENTS

| | | | | |
|---|---|---|---|---|
| 7,739,258 | B1 | 6/2010 | Halevy et al. | |
| 2008/0263507 | A1* | 10/2008 | Chang | G06Q 10/00 717/104 |
| 2013/0203337 | A1 | 8/2013 | Ling et al. | |
| 2016/0357887 | A1* | 12/2016 | Ortiz | E21B 41/00 |
| 2017/0091622 | A1* | 3/2017 | Taylor | G06F 17/18 |

* cited by examiner

*Primary Examiner* — Craig C Dorais
(74) *Attorney, Agent, or Firm* — Larson Newman, LLP

(57) ABSTRACT

An information handling system comprising a data store is configured to store time series data and a processor. The processor is configured to acquire data, the data including time series data, isolate one or more time series from the data, assigning a unique time series identifier to each time series, and storing the time series and the time series identifiers in the data store, forecast additional time points for the one or more time series using a plurality of models, determine a fit statistic for each model for each time series, select a preferred model for each time series based on the fit statistics of the models for the time series, and provide a forecast to a user for each time series.

20 Claims, 3 Drawing Sheets

SYSTEM AND METHOD FOR MODELLING TIME SERIES DATA

FIELD OF THE DISCLOSURE

The present disclosure generally relates to information handling systems, and more particularly relates to modelling time series data.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
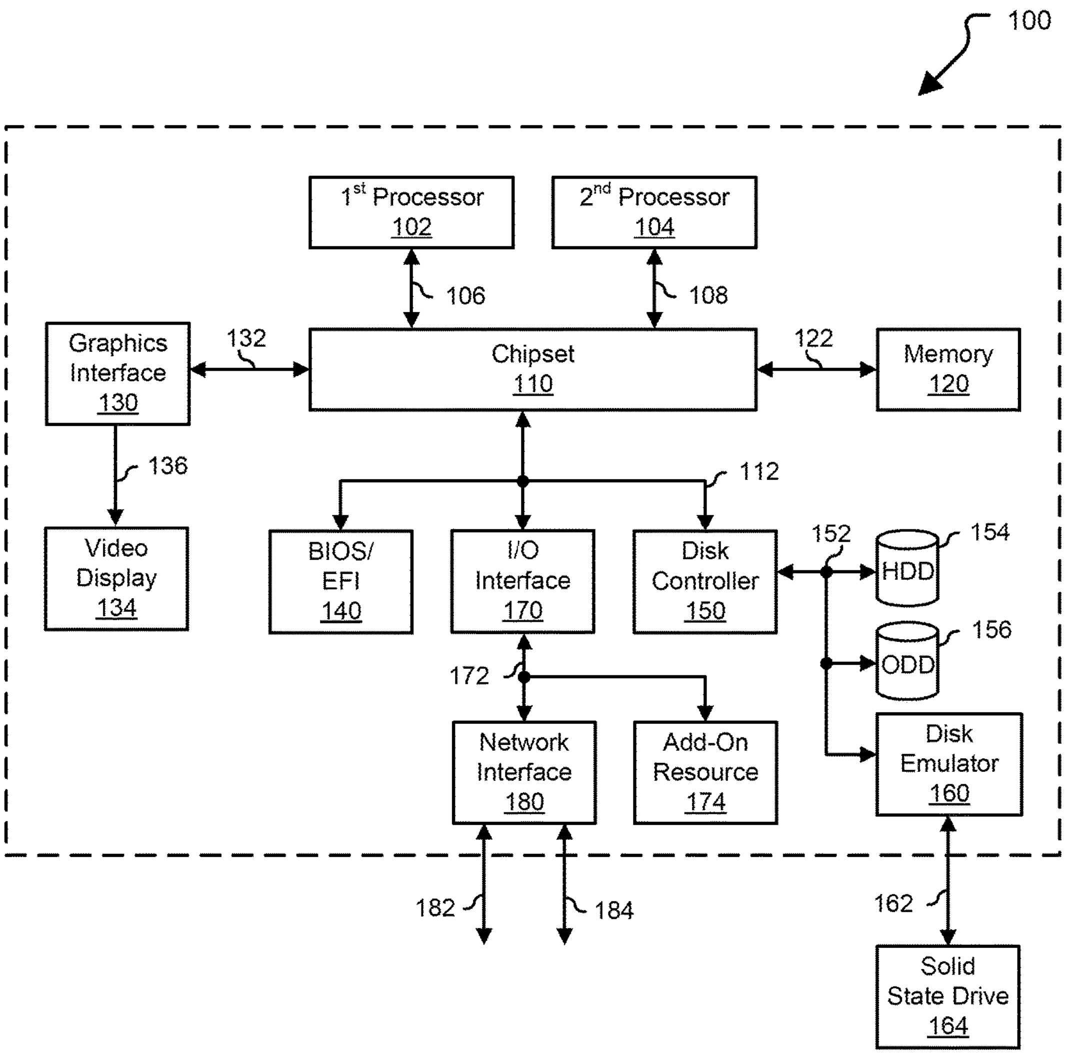
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Forecasting can be used to predict a future event using historical data. Forecasting can be a critical capability used in many areas of life on a daily basis, such as creating the weather report. It can also be used extensively by companies such as manufacturers, financial institutions and service-providers in areas of production planning, estimating earnings, or estimating the number of call center agents needed to meet demand.

The mathematics and statistics used in forecasting algorithms can be very complex, such as those used in neural network, or as simple as calculating a moving average in a spreadsheet. While spreadsheet software can be used to provide forecast from some data sets, the explosive growth rate of data in recent years has exceeded the ability for spreadsheet software to sufficiently scale. In addition, the average laptop does not have the resources to cope with all the calculations needed for these large data sets. These resource constraints have led to a infrastructure specifically dedicated to forecasting processes. The drive for better forecasting has also increased the complexity of algorithms.

Originally, forecasting software was designed for use by those with specialized knowledge (typically those with advanced degrees in science, mathematics or physics). Power Users can be few in number but can be capable of significantly impacting enterprise applications and systems. They can frequently pull out loads of data or, if given access, can ask very complex resource intensive questions.

There has been little progress in transitioning the ability to utilize this software from Power Users to Business Users (such as those in departments like finance, procurement, sales or manufacturing). Forecasting as a Service can be focused on the Business User's interface with the software and focused on creating a user-friendly experience while using the best mathematics possible.

Forecasting-as-a-Service (FaaS) can use the most common time series algorithms to generate a forecast for a given dataset in a single step. Time series forecasting can include the use of a model to predict future values based on previously observed values. Examples of the use of time series algorithms can include forecasting stock market trends, earthquake predictions and pattern recognition.

FaaS can collect fit-statistics for multiple algorithms or models tested and select the best performing model to use in calculating the forecast. The fit-statistics and forecasts can be stored for every dataset each time the service is used. In various embodiments, the user can visually validate or download the forecasts though the interactive web browser.

In various embodiments, a user can upload a dataset though the web browser. The data set can contain several time-series data segments within that dataset which can be uniquely identified by FaaS. For example, a dataset may contain monthly sales for several products sold in many countries from the past 2 years. FaaS can recognize total sales by month for every combination of product and country. Given 2 years worth of data, there will be 24 entries for every combination of product and country, which can be referred to as a time series data segment.

If the same steps were performed manually in another tool, the data would need to be prepared, configured and each algorithm would need to be trained independently to generate fit statistics and forecast values. To do so, the user would need a solid understanding about how the algorithm worked in order to properly configure them. Furthermore, such a manual process does not scale well for data sets including thousands of time-series data segments.

FaaS can run several models with the most detailed data provided and can present the forecasted numbers using the model that has the fewest errors. The process can handle millions of rows of data without loss of accuracy resulting from scaling down datasets. When trimming the data down, such as aggregating weeks into months or cities into countries, business rules are often different leading to forecast results that are not easily comparable. Using a single environment that can handle massive data volumes can make comparing models much simpler.

Manually configuring a forecast algorithm in order to find the best performing model typically begins with the most complete data segment. This approach can lead to the assumption that the model that works best for the largest or most complete data segment will also work best for the other data segments. While this approach can use fewer models, it can also limit the chance of generating a better forecast using a different model. FaaS can run several models simultaneously for each and every data segment allowing every opportunity to get the most accurate forecast.

There can be a lot of trial and error relating to the process of forecasting each time it is generated. FaaS can optimize this step by running a large array of forecasting algorithms substantially simultaneously. While the best performing model can be automatically chosen, fit-statistics can be collected and be retrievable for the models tested. Data Scientists can apply more complex models for the important data sets and FaaS can provide them with a quick basic assessment of which forecasting methods work best with little extra effort.

Figure 2:
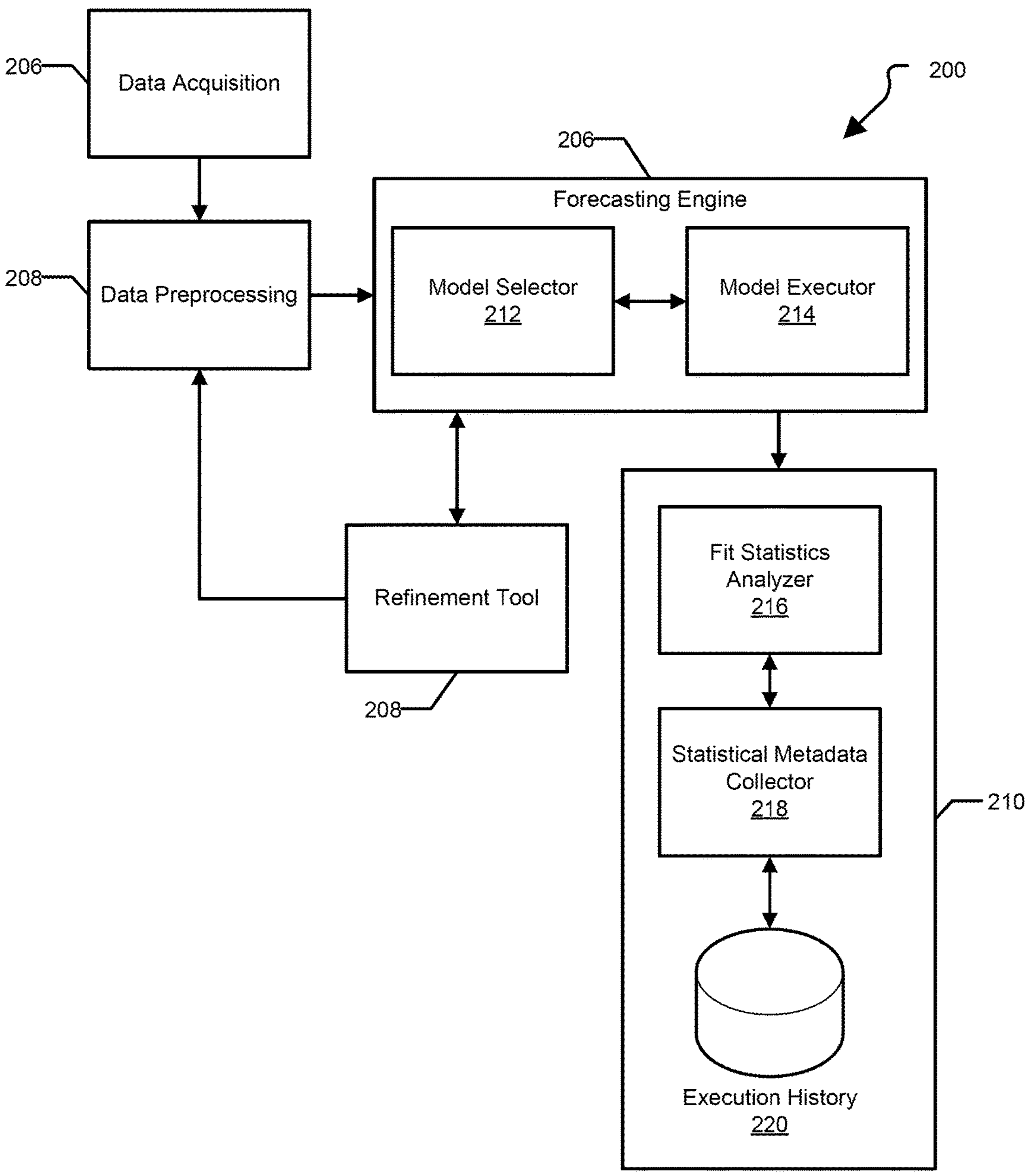
FIG. 2 is a block diagram illustrating a data analytics system, in accordance with various embodiments.

FIG. 2 is a block diagram illustrating a system 200 for performing data analytics. In various embodiments, the system includes a data acquisition component 202, a data pre-processing component 204, a forecasting engine 206, a refinement tool 208, and a statistics component 210. The forecasting engine 206 can include a model selector component 212 and a model execution component 214. The statistics engine 210 can include a fit statistics analyzer 216, a statistical metadata collector 218, and an execution history data store 220.

The data acquisition component 202 can obtain data. In various embodiments, the data can be a time series of data, such as sales data, weather data, inventory data, traffic data, process data, market data, exchange rate data, or any other variable that can change and is recorded as a function of time. In various embodiments, system 200 can be operated in a continuous or scheduled mode where the data acquisition component 202 accesses a data store, such as database or a file system, in which input data is periodically added. Alternatively, in other embodiments, the system 200 can be operated in a directed mode, such as by accessing through a web browser. When in the directed mode, the user may upload a data set to the data acquisition component 202 via the webpage or point the data acquisition component 202 to a data location, such as in a database or file system.

The data preprocessing component 204 can prepare the data for the forecasting engine 206. In various embodiments, the data preprocessing component 204 can isolate one or more sets of time series data from additional information associated with the data. For example, sales data can include dates and volumes of sales per region, product line, business unit, or the like. The pre-processing component 204 can isolate the dates and sales volumes for a particular region, product lines, business unit, or combination there of as a single set of time series data. Additionally, the pre-processing component 204 can isolate time series data for each of the regions, product lines, business units, or combinations thereof to generate multiple sets of time series data. In various embodiments, each combination of identifying factors (such as regions, product lines, and business units for the sales data) can be assigned a unique identifier that can be used to identify which combination of identifying factors corresponds with a forecast created from the time series data.

The model selector component 212 of the forecasting engine 206 can select a plurality of models for use with the data and evaluate the models to identify a optimal prediction. The model execution component 214 can train the models to the data set, test the model predictions to a test subset of the data set, and use the models to predict the future behavior of the time series data. In various embodiments, the model selector component 212 can select a plurality of candidate models, which may include all available models, to provide to the model execution component 214. In particular embodiments, the model selector 212 may use knowledge of the data set to select a subset of the available models known to perform well against the data set. For example, when the data set is sparse, the model selector may only choose models known to work with sparse data sets. In another example, if the data set is a known data set, such as a data set that has been utilized before and is now either being reused or has been extended and further predictions are needed, or the data set is of a known type, the model selector may select models that have been shown to do well with the data set of data set type.

Once the model selector 212 has selected a set of models, the model executor 214 can train the selected models with at least a portion of the data set. For example, the model executor may select a first part of the data set as a training set and a second part of the data set as a testing data set. The model executor can train the models with the training data set and test the models with the testing data set. In various embodiments, the testing results can be provided back to the model selector 212 which can analyze the results to determine the optimal model, which the model executor 214 can use to forecast future data points. In other embodiments, the model selector 212 can select a set of near optimal models and the model executor 214 can use the set of near optimal models to create an ensemble forecast. Using the ensemble forecast, the model executor may provide a forecast cone and/or provide a confidence value for the forecast. In various embodiments, the forecast cone can show the spread of the ensemble forecast which is expected to increase as the time series goes further out from the known values.

The fit statistics analyzer can analyze the fit of the models to the training and test data sets, calculate various statistics regarding the fit of the model to the data set. These statistics can be used to inform the forecasting engine 206 of the optimal model or the set of near optimal models. Additionally, the fit statistics can be stored, along with the execution history 220. The stored fit statistics may be used by the model selector to inform future selection of models with the same or similar data sets. The statistical metadata collector can generate more detailed statistical analysis of the results, such as averages, standard deviations, and min and max values for the forecast of all the models executed. Additionally, the statistical metadata collector 218 can identify outlier models, which can be noted for the model selector 212. The statistical metadata can be stored with the execution history 220.

The execution history 220 can store the fit statistics and the statistical metadata generated by the fit statistics analyzer and the statistical metadata collector. Additionally, the execution history 220 can record each execution including which models were utilized and which model or models were selected to generate the forecast. Additionally, the execution history 220 can track what data was used for the forecast. By tracking the data that was used, the forecast can be rerun at a later time, such as using additional or refined models, and comparisons to prior results can be made.

The refinement tool 208 can refine the data set for further execution. For example, a user may select a confidence level for a regional breakdown of a dataset. For example, a sales forecast may be broken down in the various regions of various sizes. As the size of the region decreases, the amount of data in the time series also decreases, resulting in a lower confidence level of the results. If the user selects a confidence level, the refinement tool can adjust the region size to achieve to required confidence level and have the models rerun. For example, the initial run of a sales forecast may be performed at a country level, and at least some countries may not have sufficient sales to produce the desired confidence level. As such, the refinement tool may trigger the data pre-processing component 204 to generate a time series for a larger sales region and cause the models to be rerun on the larger sales region to generate a new forecast. In this way, the refinement tool can increase the size of the sales region used for the forecast until the desired confidence level is reached.

Figure 3:
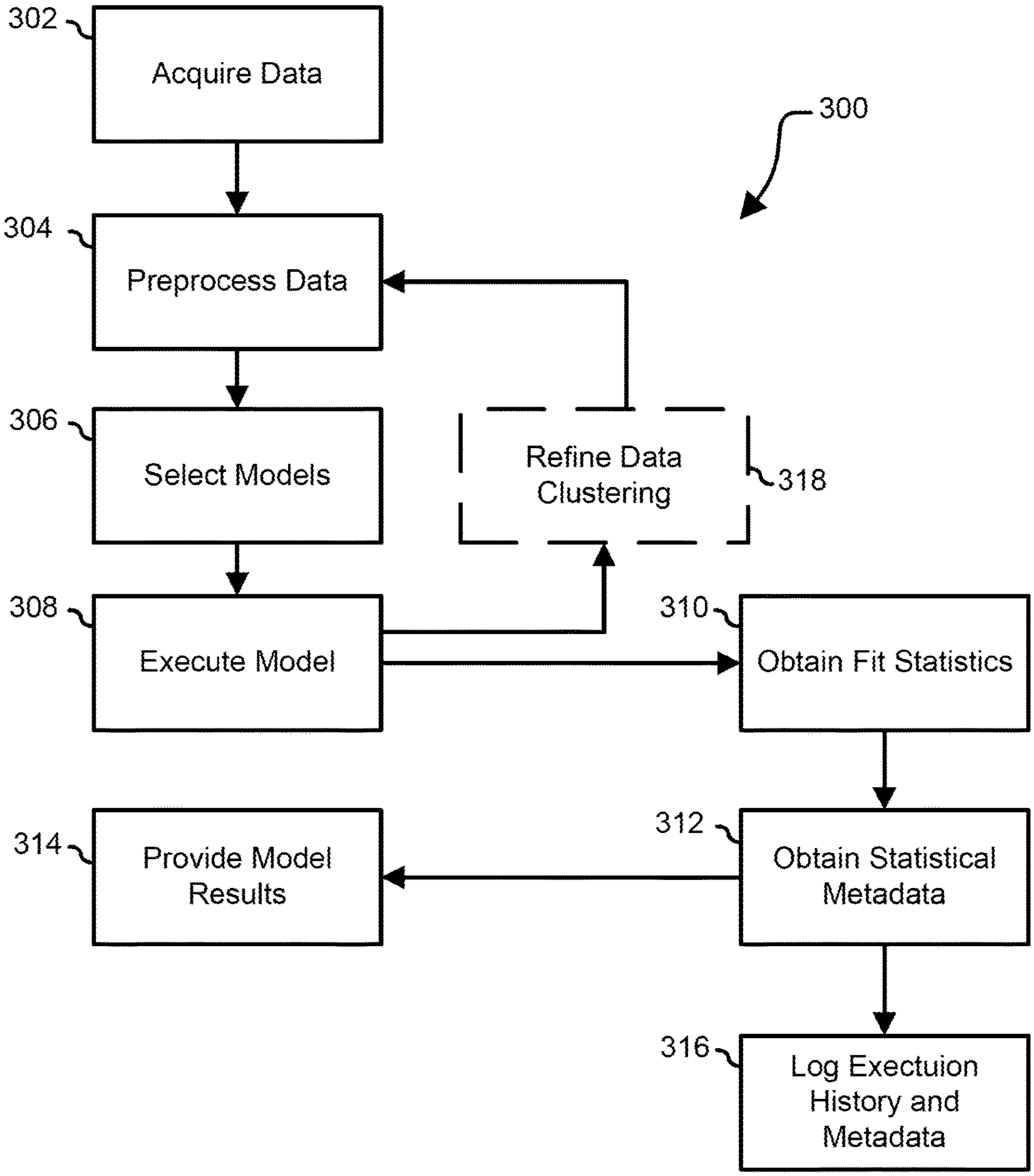
FIG. 3 is a flow diagram illustrating a method of performing data analytics, in accordance with various embodiments.

FIG. 3 is a flow diagram illustrating a method 300 of performing data analytics. At 302, the system can acquire data. The data can be acquired by accessing a data store with the data, or by receiving the data as an upload through a website. In various embodiments, the data can include time series data. Additionally, the data may include a plurality of descriptors and the like.

At 304, the data can be preprocessed to cluster the data by descriptor or set of descriptors and generate one or more time series. Each time series can be assigned a time series identifier that can be used to correlate the results back with the set of descriptors. In this way, the data provided for analysis is generic and can be processed by various models without the need to customize the model execution for a specific data set.

At 306, various models can be selected for use with the data. In various embodiments, it can be advantageous to run all the available models against the data and to select the optimal results, or to generate an ensemble of results that can provide a confidence interval for the results. In particular embodiments, the characteristics of the data set can be used to aid in the selection of the models. For example, some models may be known to not work well with sparse data sets and those models can be discarded for sparse data sets. In other embodiments, the order or priority given to models can be modified based on past results with similar data sets. For example, models selected as optimal in prior runs of stock market data may be given higher priority when additional stock market data is provided.

At 308, the selected models can be executed. In various embodiments, the selected models can be trained against a training portion of the data set and evaluated against a testing portion of the data set. An optimal model or set of near optimal models may then be selected based on their fit to the testing portion of the data set. In other embodiments, the results of an ensemble of models can be aggregated, outlier models can be identified and discarded, and an average result determined. When using an ensemble of results, additional information such as a confidence interval, and minimum and maximum values can be determined.

At 310, fit statistics can be calculated for each of the models. The fit statistics can include statistics about the fit of a single model, such as residuals, goodness of fit, deviance, and the like. In various embodiments, the fit statistics can be utilized in future selection of models and can be used to select an optimal model from which to provide a forecast to the user. At 312, statistical metadata can be obtained. The statistical metadata can include statistics across the multiple models, such as a mean, a minimum, a maximum, a standard deviation, or a combination thereof for the forecast values provided by the set of models.

At 314, the results can be provided. In various embodiments, the results can include the forecast from one model selected as the optimal model. In other embodiments, the results can include an ensemble forecast that provides additional information like a mean forecast, a spread provided by a set of models, a confidence for each time interval, and the like. At 316 the execution history (such as the data set, the models used, and the like) and the statistical fit and metadata can be logged for future reference. The logs can be used to rerun the models using the same data at a different time, such as to compare new models with the previously used models. Additionally, the logs can be used to evaluate and refine models.

At 318 the results of the model can be evaluated to refine the data clustering. In various embodiments, the data can be clustered, such as geographically, to obtain granular results over a region. The data clustering can be performed at multiple granularity levels, such as city level, state level, country level, continent level, or the like. When too many clusters are used (such as clustering locations that are too small to produce a sufficient number of data points), the confidence level in the forecast may be less than desired. In various embodiments, the granularity level can be adjusted by refining the data clustering, such as to reduce the number of clusters and increase the confidence level of the results. Additionally, the clustering may be performed such that different portions of the data have different granularity levels, for example, a forecast for North America can be determined by clustering at the state level due to a high volume of data points for those regions, and a forecast for Africa can be determined at by clustering at a continent level due to a low volume of data points for that region.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a data store configured to store time series data; and
a processor configured to:
acquire data, the data including the time series data;
isolate one or more time series from the data, assign a unique time series identifier to each time series, and store the time series and the time series identifiers in the data store;
cluster the time series data to obtain a first level of granularity for the data;
select a plurality of models based on stored fit statistics for similar data sets;
forecast additional time points for the one or more time series using the plurality of models;
determine a fit statistic for each model for each time series;
select a preferred model for each time series based on the fit statistics of the models for the time series;
determine a confidence value for the model for the times series;
cluster the time series data at an adjusted granularity level for any time series where the confidence value is below a threshold and repeating the forecast at the adjusted granularity level, adjusting the granularity level until the confidence value meets or exceeds the threshold;
store the fit statistics and an execution history along with the time series in the data store; and
provide a forecast for each time series.

2. The information handling system of claim 1, wherein the fit statistic includes statistics about the fit of a single model including residuals, goodness of fit, deviance, or any combination thereof.

3. The information handling system of claim 2, wherein the processor is further configured to store the fit statistics in the data store.

4. The information handling system of claim 1, wherein the processor is further configured to determine statistical metadata for each time series, the statistical metadata including statistics across the plurality of models including a mean, a minimum, a maximum, a standard deviation, or a combination thereof for forecast values provided by the set of models.

5. The information handling system of claim 4, wherein the processor is further configured to determine an ensemble forecast from the plurality of models and provide the ensemble forecast.

6. The information handling system of claim 1, wherein the data includes multiple levels of granularity.

7. The information handling system of claim 1, wherein the processor is further configured to repeat the forecast on updated data at specified time intervals.

8. A method comprising:
acquiring data, the data including time series data;
selecting a first level of granularity for the data;
using a processor to isolate one or more time series from the data, assign a unique time series identifier to each time series, and store the time series and the time series identifiers in a data store;
selecting a set of models based on a type of the data;
training the set of models against a first portion of the data;

testing the set of model against a second portion of the data;

forecasting additional time points for the one or more time series using the set of models;

determining a fit statistic for each model for each time series;

using the processor to select a preferred model for each time series based on the fit statistics of the models for the time series;

determining a confidence value for the model for each time series;

adjusting a granularity level for any time series where the confidence value is below a threshold and repeating the forecast at the adjusted granularity level, adjusting the granularity level until the confidence value meets or exceeds the threshold;

storing the fit statistics and an execution history along with the time series in the data store; and providing a forecast for each time series.

9. The method of claim 8, wherein the fit statistic includes statistics about the fit of a single model including residuals, goodness of fit, deviance, or any combination thereof.

10. The method of claim 9, wherein the processor is further configured to store the fit statistics in the data store.

11. The method of claim 8, wherein the processor is further configured to determine statistical metadata for each time series, the statistical metadata including statistics across the set of models including a mean, a minimum, a maximum, a standard deviation, or a combination thereof for forecast values provided by the set of models.

12. The method of claim 11, wherein the processor is further configured to determine an ensemble forecast from the set of models and provide the ensemble forecast.

13. The method of claim 8, wherein the data includes multiple levels of granularity.

14. The method of claim 8, wherein the processor is further configured to repeat the forecast on updated data at specified time intervals.

15. A method of providing forecasting as a service, comprising:

acquiring data, the data including at least one time series, the data including multiple levels of granularity;

using a processor to isolate one or more time series from the data, assign a unique time series identifier to each time series, and store the time series and the time series identifiers in a data store;

clustering the time series to obtain a first level of granularity;

selecting a plurality of models based on stored fit statistics for similar data sets;

forecasting additional time points for the one or more time series using the plurality of models;

determining a fit statistic for each model for each time series;

using the processor to select a preferred model for each time series based on the fit statistics of the models for the time series;

determining a confidence value for the model for each time series;

clustering the data at an adjusted granularity level for any time series where the confidence value is below a threshold and repeating the forecast at the adjusted granularity level, adjusting the granularity level until the confidence value meets or exceeds the threshold;

storing the fit statistics and an execution history along with the time series in the data store; and providing a forecast to a user for each time series.

16. The method of claim 15, wherein the fit statistic includes statistics about the fit of a single model including residuals, goodness of fit, deviance, or any combination thereof.

17. The method of claim 16, wherein the processor is further configured to store the fit statistics in the data store.

18. The method of claim 15, wherein the processor is further configured to determine statistical metadata for each time series, the statistical metadata including statistics across the plurality of models including a mean, a minimum, a maximum, a standard deviation, or a combination thereof for forecast values provided by the set of models.

19. The method of claim 18, wherein the processor is further configured to determine an ensemble forecast from the plurality of models and provide the ensemble forecast to the user.

20. The method of claim 15, wherein the processor is further configured to repeat the forecast on updated data at specified time intervals.

* * * * *